US011149715B2

(12) United States Patent
Moore (10) Patent No.: US 11,149,715 B2
(45) Date of Patent: *Oct. 19, 2021

(54) VERTICAL AXIS WIND TURBINE APPARATUS AND SYSTEM

(71) Applicant: Harmony Turbines Inc.

(72) Inventor: Christopher T. Moore, Palmyra, PA (US)

(73) Assignee: Harmony Turbines Inc., Palmyra, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,892

(22) Filed: Jul. 27, 2020

(65) Prior Publication Data

US 2020/0355159 A1    Nov. 12, 2020

Related U.S. Application Data

(63) Continuation of application No. 16/418,554, filed on May 21, 2019, now Pat. No. 10,724,502.

(Continued)

(51) Int. Cl.
*F03D 9/25* (2016.01)
*F03D 3/00* (2006.01)
(Continued)

(52) U.S. Cl.
CPC ............... *F03D 9/25* (2016.05); *F03D 3/005* (2013.01); *F03D 3/02* (2013.01); *F03D 3/061* (2013.01);
(Continued)

(58) Field of Classification Search
CPC ... F03D 9/25; F03D 3/061; F03D 3/02; F03D 3/005; H02K 21/24; H02K 7/183;
(Continued)

(56) References Cited

U.S. PATENT DOCUMENTS 1,519,447 A   12/1924   Fortier-Beaulieu
1,697,574 A    1/1929   Savonius
(Continued)

FOREIGN PATENT DOCUMENTS

EP    1280260 A2    1/2003
EP    2267299 B1   12/2016
(Continued)

OTHER PUBLICATIONS

Sahin, F. "Design and development of a high-speed axial-flux permanent-magnet machine." Eindhoven University of Technology, Jan. 2001.hllps://doi.org/10.6100/IR544267.

(Continued)

*Primary Examiner* — Joseph Ortega
(74) *Attorney, Agent, or Firm* — Carter, DeLuca & Farrell LLP; George Likourezos (57) ABSTRACT

A vertical axis wind turbine with improved safety, production efficiency and greater functional wind speed range. A vertical axis wind turbine comprises turbine blades having geometric characteristics of a "yin yang" symbol when viewed from the top down. The turbine blades are configured to form a scoop portion for catching wind. The surface area of the scoop portion may be dynamically configured to accommodate power production in higher wind speed ranges by dynamically furling the blades to reduce the surface area of the scoop portion as RPM begins to exceed a safe limit. First and second permanent magnet rotor arrays are dynamically positioned above and below an array of stator coils to maximize power generation.

19 Claims, 10 Drawing Sheets

Related U.S. Application Data (60) Provisional application No. 62/674,831, filed on May 22, 2018.

(51) Int. Cl.
*F03D 3/02* (2006.01)
*F03D 3/06* (2006.01)
*H02K 21/02* (2006.01)
*H02K 21/24* (2006.01)
*H02K 7/18* (2006.01)

(52) U.S. Cl.
CPC ........... *H02K 7/183* (2013.01); *H02K 21/026* (2013.01); *H02K 21/24* (2013.01); *F05B 2240/213* (2013.01); *F05B 2250/231* (2013.01); *F05B 2250/25* (2013.01); *F05B 2250/411* (2013.01)

(58) Field of Classification Search
CPC ............ H02K 21/026; F05B 2250/411; F05B 2250/25; F05B 2250/231; F05B 2240/213
See application file for complete search history.

(56) References Cited

U.S. PATENT DOCUMENTS

| | | | |
|---|---|---|---|
| 3,067,371 A * | 12/1962 | Bradley | H02P 7/066 |
| | | | 388/816 |
| 3,856,432 A | 12/1974 | Campagnuolo et al. | |
| 4,293,274 A | 10/1981 | Gilman | |
| 4,342,539 A | 8/1982 | Potter | |
| 4,545,729 A | 10/1985 | Storm | |
| 4,838,757 A | 6/1989 | Benesh | |
| 4,996,457 A | 2/1991 | Hawsey et al. | |
| 5,098,264 A | 3/1992 | Lew | |
| 5,133,637 A | 7/1992 | Wadsworth | |
| 5,245,238 A | 9/1993 | Lynch et al. | |
| 5,380,149 A | 1/1995 | Valsamidis | |
| 5,425,619 A | 6/1995 | Aylor | |
| 5,451,137 A | 9/1995 | Gorlov | |
| 5,494,407 A | 2/1996 | Benesh | |
| 5,531,567 A | 7/1996 | Hulls | |
| 5,874,796 A | 2/1999 | Petersen | |
| 5,982,074 A | 11/1999 | Smith et al. | |
| 6,011,337 A | 1/2000 | Lin et al. | |
| 6,172,429 B1 | 1/2001 | Russell | |
| 6,177,735 B1 | 1/2001 | Chapman et al. | |
| 6,242,818 B1 | 6/2001 | Smedley | |
| 6,283,711 B1 | 9/2001 | Borg et al. | |
| 6,465,899 B2 | 10/2002 | Roberts | |
| 6,808,366 B2 | 10/2004 | Sikes | |
| 6,833,502 B1 | 12/2004 | Boatner | |
| 6,857,846 B2 | 2/2005 | Miller | |
| 6,910,873 B2 | 6/2005 | Kaliski | |
| 6,917,136 B2 | 7/2005 | Thornton et al. | |
| 6,943,478 B2 | 9/2005 | Zepp et al. | |
| 6,995,494 B2 | 2/2006 | Haugan et al. | |
| 7,008,171 B1 | 3/2006 | Whitworth | |
| 7,034,427 B2 | 4/2006 | Hirzel | |
| 7,132,760 B2 | 11/2006 | Becker | |
| 7,154,193 B2 | 12/2006 | Jansen et al. | |
| 7,329,965 B2 | 2/2008 | Roberts et al. | |
| 7,344,353 B2 | 3/2008 | Naskali et al. | |
| 7,484,363 B2 | 2/2009 | Reidy et al. | |
| 7,514,833 B2 | 4/2009 | Hsu et al. | |
| 7,595,575 B2 | 9/2009 | Kaneko et al. | |
| 7,646,178 B1 | 1/2010 | Fradella | |
| 7,692,357 B2 | 4/2010 | Qu et al. | |
| 7,696,635 B2 | 4/2010 | Boone | |
| 7,726,934 B2 | 6/2010 | Cowan | |
| 7,888,839 B2 | 2/2011 | Gabrys et al. | |
| 7,896,608 B2 | 3/2011 | Whitworth et al. | |
| 7,956,484 B2 | 6/2011 | Stiesdal | |
| 8,134,246 B1 * | 3/2012 | Lois | F03D 9/11 |
| | | | 290/44 |
| 8,222,792 B2 | 7/2012 | Platon et al. | |
| 8,226,369 B2 | 7/2012 | Clark | |
| 8,373,297 B2 | 2/2013 | Grigg | |
| 8,482,181 B2 | 7/2013 | Murray, III | |
| 8,487,470 B2 | 7/2013 | Grassman | |
| 8,558,426 B2 | 10/2013 | Stiesdal | |
| 8,912,704 B2 | 12/2014 | Petter et al. | |
| 9,567,972 B2 | 2/2017 | Bassett | |
| 2003/0059306 A1 | 3/2003 | Miller | |
| 2004/0042899 A1 | 3/2004 | Khan | |
| 2004/0251761 A1 | 12/2004 | Hirzel | |
| 2005/0184689 A1 | 8/2005 | Maslov et al. | |
| 2006/0032361 A1 | 2/2006 | Deschamps et al. | |
| 2007/0243066 A1 | 10/2007 | Baron | |
| 2008/0191487 A1 | 8/2008 | Morgan et al. | |
| 2010/0013238 A1 | 1/2010 | Jessie et al. | |
| 2010/0133851 A1 | 6/2010 | Devitt | |
| 2010/0164422 A1 | 7/2010 | Shu et al. | |
| 2010/0296913 A1 | 11/2010 | Lee | |
| 2012/0183407 A1 | 7/2012 | Vallejo | |
| 2012/0207605 A1 | 8/2012 | Hessamodini | |
| 2013/0108458 A1 | 5/2013 | Goldstein | |
| 2014/0167414 A1 * | 6/2014 | Farb | H02K 7/1823 |
| | | | 290/43 |
| 2014/0321989 A1 | 10/2014 | Chambers et al. | |
| 2015/0192107 A1 | 7/2015 | Kirchman | |
| 2015/0337809 A1 | 11/2015 | Jordan, Sr. | |
| 2016/0169197 A1 | 6/2016 | Mak | |
| 2017/0107972 A1 | 4/2017 | Tubaileh et al. | |
| 2017/0138344 A1 | 5/2017 | Guignard | |
| 2018/0038344 A1 | 2/2018 | Elayyan | |
| 2018/0363624 A1 | 12/2018 | Focanti et al. | |
| 2019/0291372 A1 | 9/2019 | Albert et al. | |
| 2019/0293051 A1 | 9/2019 | Bishop | |
| 2020/0132047 A1 | 4/2020 | Saeed | |

FOREIGN PATENT DOCUMENTS

| | | |
|---|---|---|
| JP | 2012044817 A | 3/2012 |
| JP | 6166674 B2 | 7/2017 |
| WO | 2012017303 A2 | 2/2012 |

OTHER PUBLICATIONS

Abbascia, G., et al., "Magnetically Levitated Vertical-Axis Wind Turbine." Worcester Polytechnic Institute, Apr. 2009.

Dhoble, L., et al., "CFO Analysis of Savonius Vertical Axis Wind Turbine: A Review." International Research Journal of Engineering and Technology, vol. 3, No. 1, pp. 958-962. Jan. 2016.

Mun, H'ng Yin, "Flow and Turbulence Characteristics Through a Vertical-Axis Wind Turbine Using Eddy Covariance Method." Thesis, University of Malaysia, Feb. 2016.

Ali, M.H., "Experimental Comparison Study for Savonius Wind Turbine of Two & Three Blades at Low Wind Speed." International Journal of Modern Engineering Research, vol. 3, No. 5, Sep.-Oct. 2013, p. 2978-2986.

Moreels, D. "This New Generation of Direct-Drive Electric Machines will Power our Future." Online blog, Jun. 14, 2017. Accessed at hllps://www.magnax.com/magnax-blog/axial-flux-vs-radial-flux-for-direct-drive-generators.

Wannakarn, P. et al., "Design and construction of axial flux permanent magnet generator for wind turbine generated DC voltage at rated power 1500 W." IEEE, 2011 4th International Conference on Electric Utility Deregulation and Restructuring and Power Technologies {DRPT), Weihai, Shandong, 2011, pp. 763-766, doi: 10.1109/DRPT.2011.5993994.

Latoufis, K.C. et al., "Axial Flux Permanent Magnet Generator Design for Low Cost Manufacturing of Small Wind Turbines." Wind Engineering, vol. 36, No. 4, 2012. pp. 411-442. Multi-Science Publishing Co., Brentwood, UK.

Tapis, J.A., et al., "Axial Flux Surface Mounted PM Machine with Field Weakening Capability." Recent Developments of Electrical Drives, pp. 321-334. 2006. Springer.

Vansompel, H. et al. "Axial-Flux PM Machines With Variable Air Gap." IEEE Transactions on Industrial Electronics, vol. 61, No. 2, Feb. 2014.

(56) References Cited

OTHER PUBLICATIONS

Ahmed, D., et al., "An optimal design of careless direct-drive axial flux permanent magnet generator for wind turbine." Journal of Physics: Conference Series 439 (2013) 012039. IOP Publishing.

Cooper, P. "Development and analysis of vertical-axis wind turbines." WIT Transactions on State of the Art in Science and Engineering. vol. 44. 2010. WIT Press.

Chan, T.F. et al. "An Axial-Flux Permanent-Magnet Synchronous Generator for a Direct-Coupled Wind-Turbine System." IEEE Transactions on Energy Conversion, vol. 22, No. 1, pp. 86-94. Mar. 2007.

\* cited by examiner

Scoop Front View

Scoop Side View

Scoop Top View

VERTICAL AXIS WIND TURBINE APPARATUS AND SYSTEM

CROSS-REFERENCE TO RELATED APPLICATIONS

This application is a continuation of, and claims the benefit of, and priority to, U.S. patent application Ser. No. 16/418,554 filed on May 21, 2019, which claims the benefit of, and priority to, U.S. Provisional Patent Application No. 62/674,831 filed on May 22, 2018, the entire contents of both of which are incorporated by reference herein.

FIELD

The present disclosure relates to the field of wind turbines; in particular, a vertical axis wind turbine and system for improved overall safety, power production and wind speed range performance.

BACKGROUND

Most of the commercial wind turbines on the market today utilize a braking mechanism to help protect them from over-revving in high wind situations. This mechanism has drawbacks when the wind is greater than the braking mechanism can handle. In these cases, the braking mechanism can heat up to the point where it catches the lubricants in the generator housing on fire and complete failure of the wind turbine quickly follows. There are also drawbacks even when the braking mechanism is operating properly. In a situation where there are high winds and the brake is operating properly, the brake prevents the wind turbine from spinning and producing electricity during the very times when the wind is the strongest. If a solution were devised that could allow a wind turbine to safely continue operation in wind conditions greater than previously possible, the wind industry could both reduce losses due to braking mechanism failures as well as increase their energy production by producing electricity when other turbines have to remain offline.

When a permanent magnet comes into close proximity of a solid core winding such as the ones found in motors and generators there is a strong attraction created between the two which can cause a lockup or cogging effect at low or startup RPM ranges. This is a difficult problem to overcome in wind turbines due to the fact that there are many permanent magnets and solid core windings in close proximity to one another so that the turbine can produce sufficient energy output. A general practice in residential size wind turbine design is to utilize open core or air coil windings which are coils of copper wrapped around nothing but a hollow tube or wrapped around a form that is removed after the coil is wrapped. This absence of solid iron cores in the windings eliminates the lockup or cogging effect at low RPM ranges, but produces very little energy output as compared to solid core coils. In effect the main purpose of the wind turbine, namely to produce large amounts of clean energy, is negated by this fix to the cogging or lockup problem. Hence most residential size wind turbines are producing only a fraction of the energy that they could be producing if they were designed differently. In larger more expensive turbines there are a number of expensive and costly systems used to help reduce the cogging or lockup effects. They often handle these issues within an expensive gearbox. Currently there are a large number of challenges faced by the wind industry with regard to gearbox reliability. Gearbox failure accounts for most of the downtime per failure in wind turbines and significantly increases operation and maintenance costs. If a solution could be devised to eliminate the lockup or cogging effect at low RPM or startup speeds; while at the same time utilizing solid core generator coils to maximize energy production, the wind industry could enjoy a number of beneficial effects such as reduced size to power ratios, greater generation capacity and increased usage in urban areas due to smaller more energy dense designs.

Most conventional Horizontal Axis Wind Turbine designs are designed around an expensive unit often mounted hundreds of feet off the ground to accommodate all of the mechanisms necessary for directly facing into the wind, power generation as well as braking and gearbox mechanisms. This results in a large amount of expensive equipment being very high up in the air where maintenance workers receive hazard pay just to go up and perform routine maintenance on the turbines. It further complicates the problem when something is going wrong with the turbine because now someone has to risk their life to enter a potentially dangerous environment hundreds of feet off the ground. If a solution could be devised to keep the expensive and heavy parts on the ground it would eliminate a multitude of problems faced by the wind industry today.

Through applied effort, ingenuity, and innovation, Applicant has identified a number of deficiencies and problems with wind turbine cost, construction, and performance. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is a vertical axis wind turbine with an improved turbine blade design for maximizing production efficiency.

Another object of the present disclosure is a vertical axis wind turbine with an improved generator design to enable a variable axial air gap between the generator rotors and stators to eliminate magnetic cogging at low wind speeds. Another advantage of the present disclosure is a pair of magnet rotor arrays utilizing both magnetic poles above and below the stator coils to maximize power generation (density).

An object of the present disclosure is a vertical axis wind turbine with a furling turbine blade design to dynamically configure turbine blade surface area to enable power generation in high wind conditions.

Exemplary embodiments of the present disclosure include a vertical axis wind turbine apparatus comprising a turbine blade assembly comprising one or more pairs of blades configured to be mateably interfaced to define a circle, each blade in the one or more pairs of blades being configured as equal oppositely oriented semicircles having a center point on a diameter of the circle when mateably interfaced, the one or more pairs of blades having an upper surface, a lower surface, and a side wall extending from the upper surface to the lower surface to define a scoop portion, the one or more pairs of blades being configured to furl and unfurl around a central axis; and, a generator assembly comprising an upper magnet platter and a lower magnet platter being disposed on a rotary shaft, a plurality of coils disposed around a circumference of the rotary shaft, and a governor assembly coupled to the rotary shaft, the governor assembly being operable to dynamically configure a position of the upper magnet platter and the lower magnet platter relative to the plurality of coils.

An aspect of the present disclosure provides for a vertical axis wind turbine apparatus comprising a turbine blade assembly comprising one or more pairs of blades having an upper surface, a lower surface, a side wall extending from the upper surface to lower surface to define a scoop portion, and blade teeth disposed on a semicircular perimeter portion of the upper surface and lower surface; a generator assembly; a rotary shaft having a shaft gear disposed thereon, the rotary shaft being operably engaged between the turbine assembly and the generator assembly, the shaft gear being configured to matably interface with the blade teeth of each pair of blades in the one or more pairs of blades; a blade support configured to couple each pair of blades in the one or more pairs of blades to the rotary shaft, the blade support operable to maintain a desired orientation between each pair of blades in the one or more pairs of blades; and, the generator assembly comprising an upper magnet platter and a lower magnet platter being disposed on the rotary shaft, a plurality of coils disposed around a circumference of the rotary shaft, and a governor assembly coupled to the rotary shaft, the governor assembly being operable to dynamically configure a position of the upper magnet platter and the lower magnet platter relative to the plurality of coils.

Another aspect of the present disclosure provides for a vertical axis wind turbine apparatus comprising a turbine blade assembly comprising one or more pairs of blades configured to furl and unfurl around a central axis in proportion to wind speed, each blade in the one or more pairs of blades defining a scoop; a rotary shaft being operably engaged with the turbine blade assembly; and, a generator assembly comprising an upper magnet platter and a lower magnet platter being disposed on the rotary shaft, a plurality of coils disposed around a circumference of the rotary shaft, and a governor assembly coupled to the rotary shaft, the governor assembly being operable to dynamically configure a position of the upper magnet platter and the lower magnet platter relative to the plurality of coils in proportion to a rotary speed of the governor assembly.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Embodiments of the present disclosure provide for a vertical axis wind turbine with improved production efficiency and greater functional wind speed range, as compared to prior art solutions. According to embodiments of the present disclosure, the vertical axis wind turbine incorporates a novel blade design that incorporates the geometric characteristics of a "yin yang" symbol when viewed from the top down. In an embodiment, three sets of turbine blade pairs are oriented in a stacked configuration around an axis, with each set being offset 60 degrees from the preceding and/or successive set. In an embodiment that utilizes four sets of blades, each set being offset 45 degrees from the preceding and/or successive set. The turbine blades are configured to form a "scoop" portion for catching wind. The surface area of the scoop portion may be dynamically configured to accommodate power production in higher wind speed ranges, compared to prior art solutions. The present invention accomplishes this by dynamically furling or closing the blades to reduce the surface area of the scoop portion as RPM begins to exceed a safe limit. As the blades furl (close), the surface area of the scoop portion is reduced thereby reducing the wind resistance of the blades and slowing the RPMs. Since the blades are configured as concentric circles, the blades can continue to function until almost no exposure (i.e. closed configuration) in extremely high wind conditions. As wind speeds are reduced to functional ranges, the blades will unfurl back to an optimal position.

According to embodiments of the present disclosure, the vertical axis wind turbine comprises a novel generator assembly for improved production efficiency and power generation. According to an embodiment, first and second permanent magnet rotor arrays are dynamically positioned above and below an array of stator coils to maximize power generation. By positioning permanent magnet rotor arrays proximal to a first and second end of the stator coils in the array, both poles (ends) of the coils are effectively utilized to maximize power generation (i.e. density). According to an embodiment, iron laminate cores are utilized in the pickup coils to further maximize power generation. In order to prevent magnetic cogging of the coil array in low wind scenarios, the generator rotors (magnets) located above and below the coils are configured to have an axial "air gap" between the coils (stator). As wind speed and RPMs increase, a centrifugal device being operably engaged with the generator shaft functions to push the rotor magnets closer to the stator coils to produce electricity. At or above a threshold RPM range, the air gap between the generator rotors and the stator coils will be minimized to an optimal distance to maximize power generation (density).

According to embodiments of the present disclosure, the vertical axis wind turbine further comprises a support structure for safety as well as weather mitigation. In certain embodiments, the support structure comprises a rigid frame to support the turbine in a functional implementation. The support structure may be comprised of a concrete slab anchored to the ground. A generator may be fixed directly onto the concrete slab, with the rigid frame supporting the blade array and maintaining vertically alignment. The blade array connects directly to the generator shaft to turn the generator for power generation. Due to the dynamic manipulation of both the surface area of the scoop portion of the blades and the air gap between the generator rotors and the coils, no gearing is required for construction between the blades and the generator.

Figure 1:
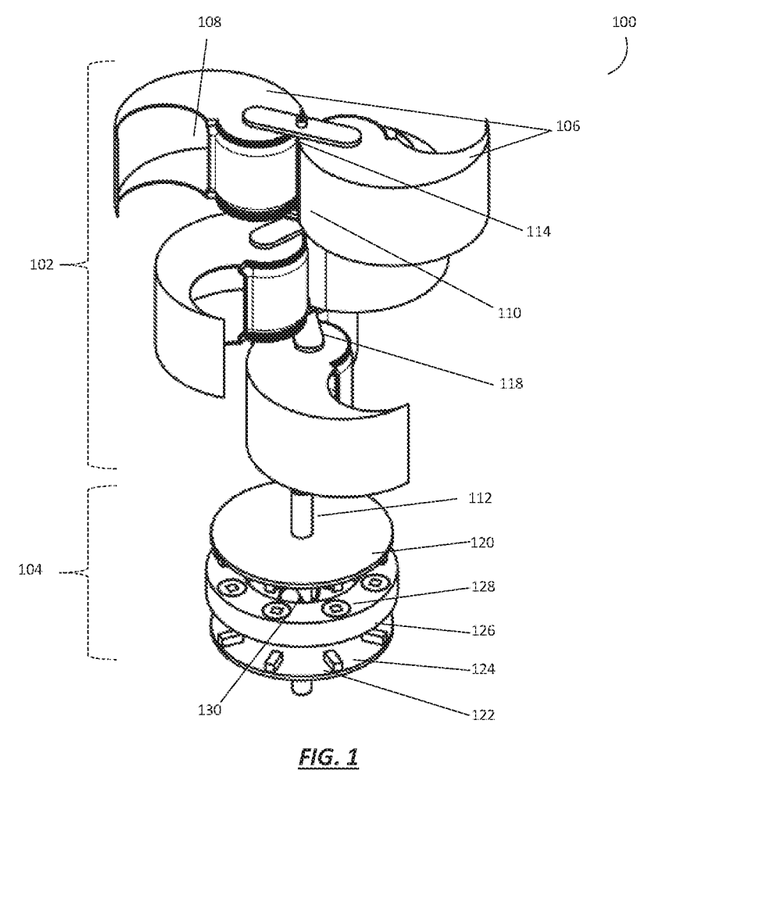
FIG. 1 is an isometric projection of a vertical axis wind turbine, according to an embodiment of the present disclosure.

Referring now to FIG. 1, an isometric projection of a vertical axis wind turbine 100 is shown. According to an embodiment of the present disclosure, vertical axis wind turbine 100 is generally comprised of a turbine assembly 102, a generator assembly 104, and a shaft 112 being operably engaged between turbine assembly 102 and generator assembly 104. Turbine assembly 102 is generally comprised of one or more pairs of blades 106, blade support/connector 118, and shaft gear 110. According to an embodiment, turbine assembly 102 is comprised of three pairs of blades 106. The three pairs of are oriented vertically in a stacked configuration with shaft 112 serving as an axis of rotation. Each pair of blades 106 are offset 60 degrees from the preceding and/or successive set; the three pairs of blades 106 resembling a helix configuration when oriented in an extended position. In an alternative embodiment, turbine assembly 102 is comprised of four pairs of blades 106, with each set being offset 45 degrees from the preceding and/or successive set. Blades 106 are configured as equal oppositely oriented semicircles such that blades 106 may be mateably interfaced to define a circle having a common center point. When oriented in a closed configuration, blades 106 display the geometry of a yin-yang symbol. Blades 106 comprise an upper surface, a lower surface, and a side wall extending between the upper surface and the lower surface to define an interior portion or scoop portion 108. Blades 106 comprise a plurality of blade teeth 114 disposed on a semicircular perimeter portion of the upper surface and the lower surface of blade 106, adjacent to shaft 112 when assembled. When blades 106 are functionally configured in pair, as shown in FIG. 1, blade teeth 114 of a first blade 106 interface with blade teeth 114 of a second blade 106. Blade teeth 114 function to furl and unfurl blades 106 between an extended configuration (as shown in FIG. 1) to a closed configuration. A shaft gear 110 is operably engaged with a lower portion of blades 106 to engage blade teeth 114 to furl and unfurl blades 106. Blade supports 118 are configured to couple blades 106 to shaft 112, and maintain the desired orientation between each set of blades 106 (e.g. 60 degrees in a three blade pair configuration).

According to an embodiment of the present disclosure, generator assembly 104 is generally comprised of an upper magnet platter or upper generator rotor 120, a lower magnet platter or lower generator rotor 122, a coil array housing 126, a plurality of coils or stators 128, a governor 130, and a plurality of magnets 124. Upper magnet platter 120, lower magnet platter 122, coil array housing 126, and governor 130 are disposed around shaft 112. According to an embodiment, the plurality of magnets 124 are disposed equidistant around the circumference of upper magnet platter 120 and lower magnet platter 124 to define an array. The array of magnets 124 disposed on upper magnet platter 120 may be oppositely oriented in polarity to that of the array of magnets 124 disposed on lower magnet platter 122. The enables generator assembly 104 to achieve maximize power generation (i.e. density) between generator rotors and stator coils. The plurality of coils 128 are disposed equidistant around the circumference of coil array housing 126 to define an array. Each coil in the plurality of coils 128 are comprised of iron laminate (i.e. solid) cores.

Figure 2:
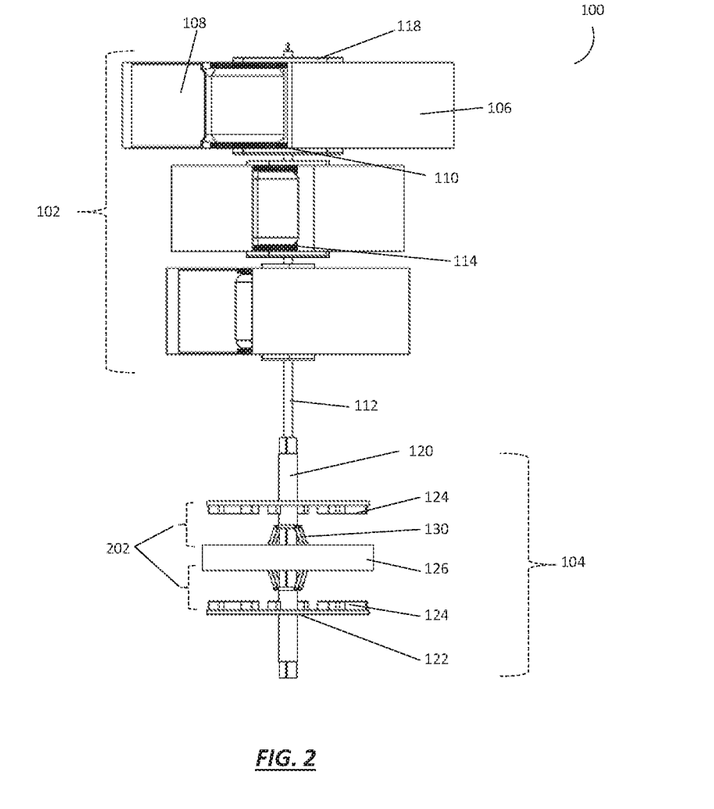
FIG. 2 is a plan view of a vertical axis wind turbine, according to an embodiment of the present disclosure.
Figure 3:
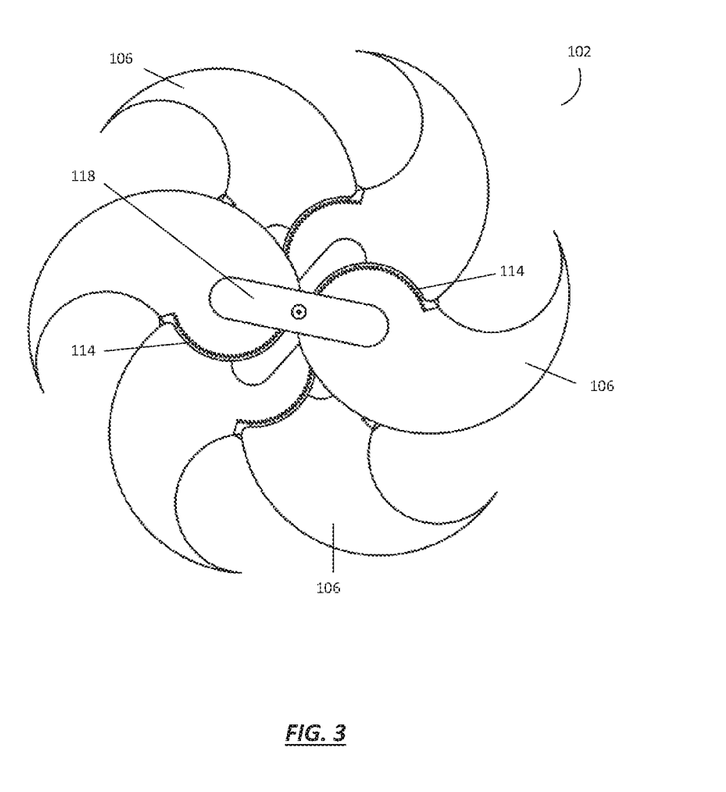
FIG. 3 is a top down view of a vertical axis wind turbine, according to an embodiment of the present disclosure.

Referring now to FIG. 2, a plan view of vertical axis wind turbine 100 is shown. According to an embodiment of the present disclosure, turbine assembly 102 is shown in a three pair configuration. As shown in FIG. 2, blades 106 are configured in a fully extended configuration. When in a fully extended configuration, the maximum amount of surface area for scoop portion 108 is exposed to passing wind. Scoop portion 108 catches passing wind to generate wind resistance, and thereby turns turbine assembly 102 in the direction of the wind to rotate shaft 112. Each pair of blades 106 in the three pair configuration is offset at 60 degree intervals, such that the maximum amount of surface area for scoop portion 108 in each set of blades is exposed to the wind as turbine assembly 102 rotates around its axis. As shown in FIG. 3, each blade in the three pair configuration is spaced equidistant from the other blade around a 360 degree axis of symmetry. As wind speed increases, blades 106 are furled to reduce the amount of surface area of scoop portion 108 being exposed to wind, thereby reducing the amount of wind resistance being applied to turbine assembly 102. This enables turbine assembly 102 to maintain an optimal RPM range in a variety of wind speeds, since the wind resistance created by blades 106 is proportional to the amount of surface area of scoop 108 being exposed to the passing wind (i.e. dynamic wind resistance).

According to an embodiment of the present disclosure and in further reference to FIG. 2, generator assembly 104 is likewise dynamically configured to an optimal function configuration relative to the amount of torque (e.g. wind speed) being generated by turbine assembly 102 on shaft 112. When in a default or static position (e.g. low or no wind scenarios), as shown in FIG. 2, governor 130 is fully extended to define a maximum distance between upper magnet platter 120 and lower magnet platter 122 and coil array housing 126. In an embodiment, governor 130 is configured as a ball governor; however, governor 130 may be configured as a ball governor, servomotor, other rotary and linear actuators, and the like. The distance between upper magnet platter 120 and an upper surface of coil array housing 126, and the distance between lower magnet platter 122 and a lower surface of coil array housing 126 defines an axial air gap 202 between magnets 124 and coils 128. The axial air gap 202 functions to reduce the attractive force between the magnets 124 and coils 128 in order to prevent magnetic cogging of coil array housing 126 in low wind scenarios. As wind speed and RPMs increase, governor 130 functions to operably engage with the generator platters 120 and 122 functions to decrease air gap 202 between upper magnet platter 120 and upper surface of coil array housing 126 and lower magnet platter 122 and lower surface of coil array housing 126. Once the RPM speed of generator assembly 104 reaches a predetermined threshold, air gap 202 is minimized to an optimal minimum distance in order to maximize power generation (density) between generator and stator coils.

Figure 4:
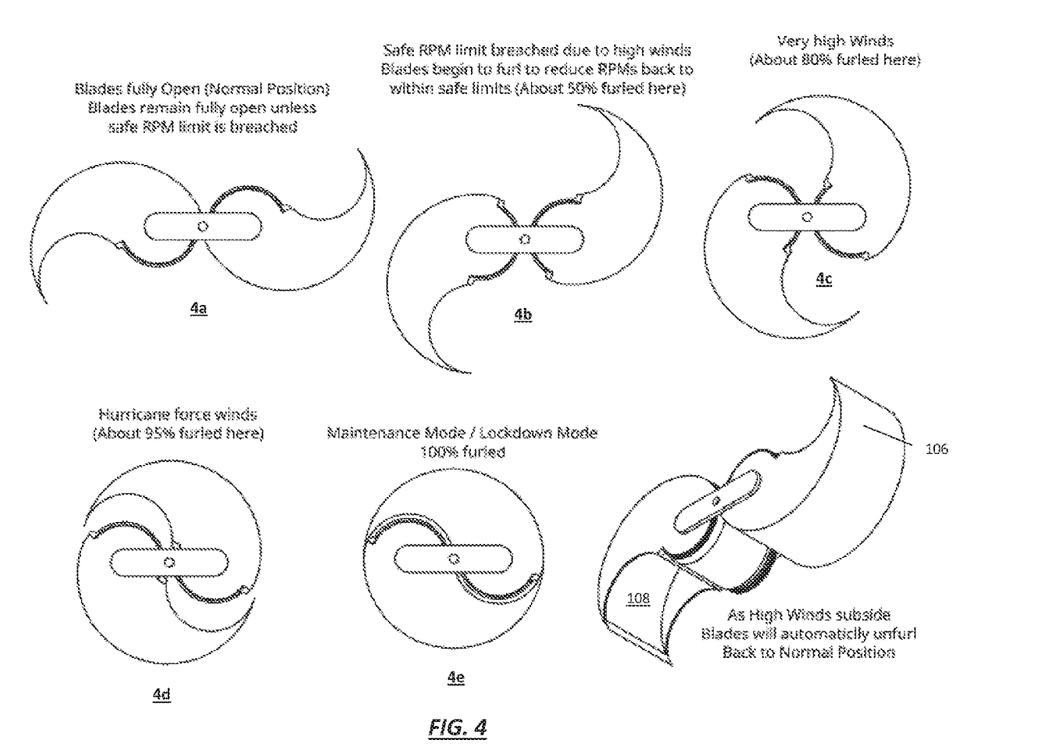
FIG. 4 is a series of functional views illustrating the furling of turbine blades at various wind speeds, according to an embodiment of the present disclosure.

Referring now to FIG. 4, a series of functional views illustrating the furling of turbine blades 106 at various wind speeds is shown. According to embodiments of the present disclosure and in further reference to the embodiments shown and described in FIGS. 1 and 2 above, turbine blades 106 as configured in turbine assembly 102 are dynamically furled and unfurled proportionately to wind speed between a fully extended configuration 4a and a closed position 4e. In a fully extended configuration 4a, blades 106 are fully open to expose a maximum amount of surface area of scoop portion 108 to passing wind. Blades 106 remain fully open unless RPMs exceed a safety threshold. If the RPM threshold is exceeded due to high winds, blades 106 begin to furl to reduce the exposed surface area of scoop portion 108 until RPMs fall below the safety threshold. For example, configuration 4b illustrates a furling configuration of approximately 50%. If RPM threshold remains exceeded in configuration 4b due to high winds, blades 106 will continue to furl to configuration 4c (approximately 80% furled), and continue to configuration 4d (approximately 95% furled) as necessary. In extreme wind conditions, blades 106 may be fully furled to configuration 4e, which hides all surface area of scoop portion 108. Blades 106 may be configured in configuration 4e when vertical axis wind turbine 100 is in a maintenance mode or a lockdown mode.

Figure 5:
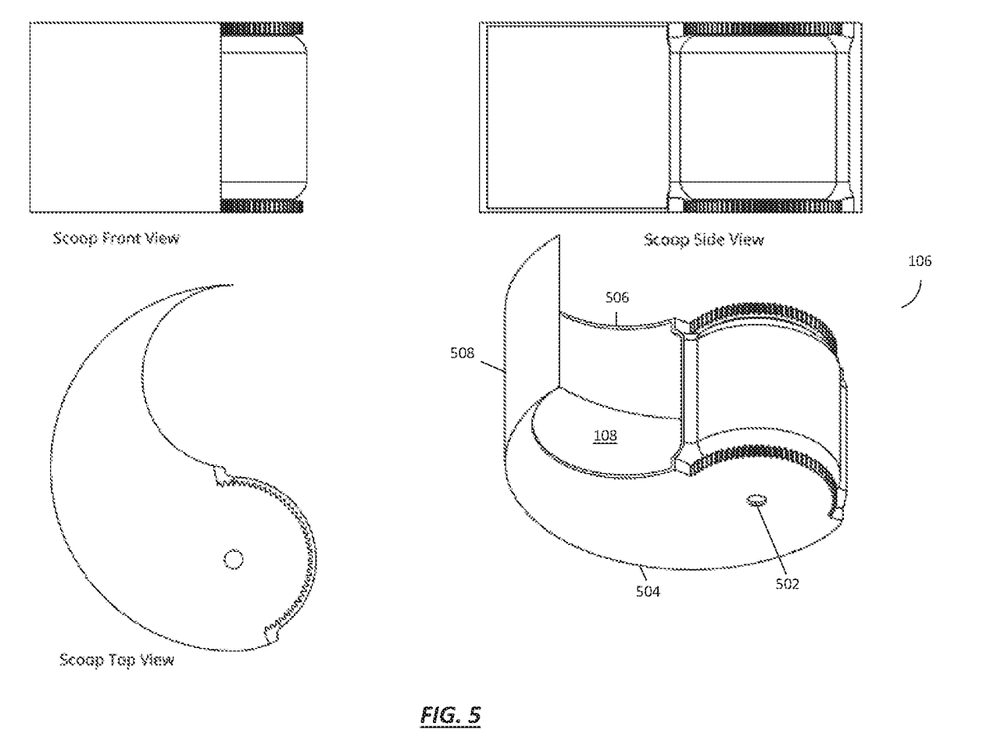
FIG. 5 is a series of plan views of turbine blades for a vertical axis wind turbine, according to an embodiment of the present disclosure.

Referring now to FIG. 5, a series of plan views of turbine blades 106 for vertical axis wind turbine 100 is shown. According to an embodiment of the present disclosure and in further reference to the embodiments shown and described in FIGS. 1 and 2 above, a detailed view of a single turbine blade 106 is provided. An aperture 502 extending through upper and lower surfaces of blade 506 is configured to interface with a shaft connecting upper and lower blade support/connectors 118 (as shown in FIGS. 1 and 2) to secure blade 106 in a fixed position around the shaft.

Figure 6:
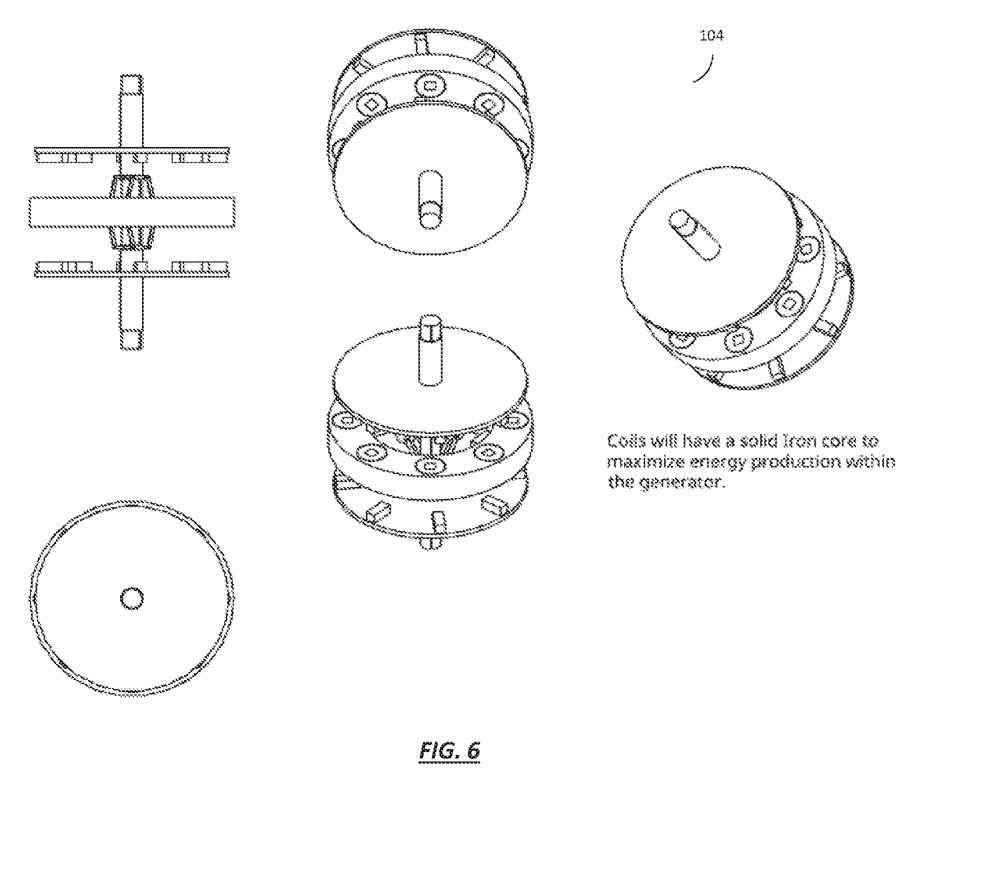
FIG. 6 is a series of isometric and plan views of a generator assembly for a vertical axis wind turbine, according to an embodiment of the present disclosure.
Figure 7:
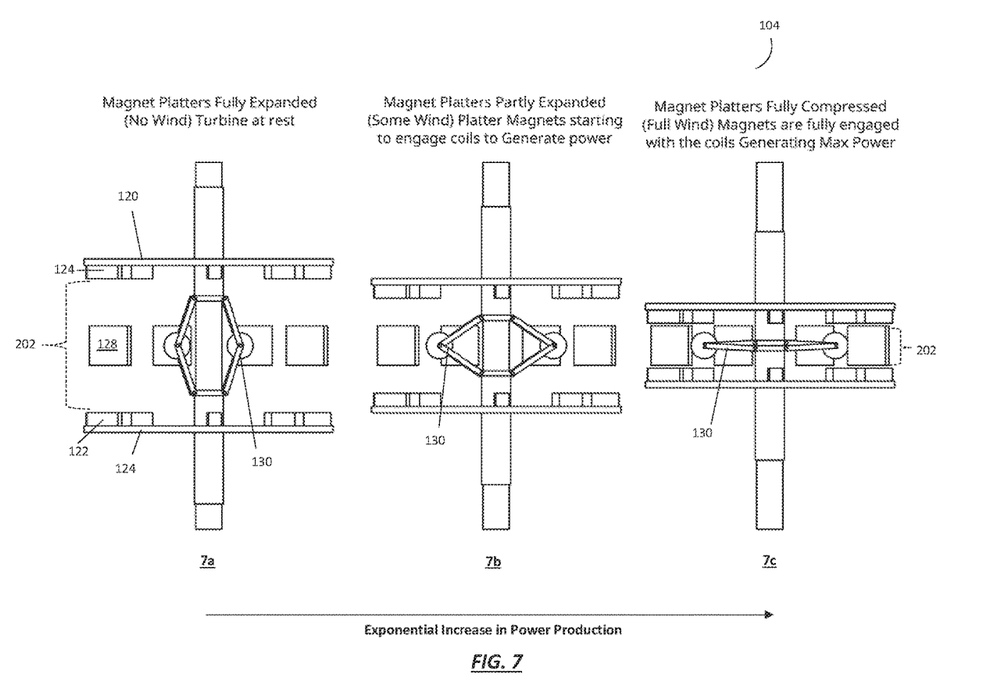
FIG. 7 is a series of functional views illustrating variable air gap of the generator assembly at various wind speeds, according to an embodiment of the present disclosure.
Figure 8:
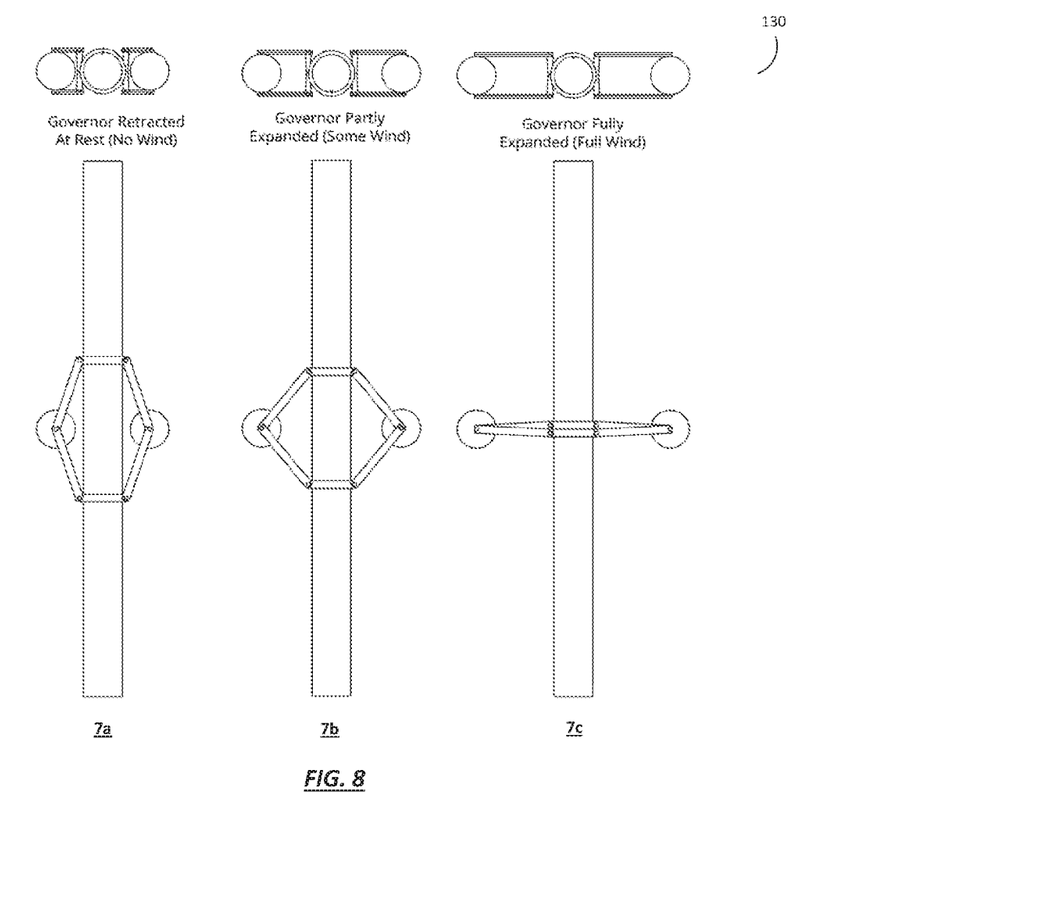
FIG. 8 is a series of functional views illustrating a configuration of a generator governor at various wind speeds, according to an embodiment of the present disclosure.

Referring now to FIGS. 6-8, a series of functional views illustrating variable air gap 202 for generator assembly 104 across various wind speeds is shown. According to embodiments of the present disclosure, generator assembly 104 is configured in configuration 7a when vertical axis wind turbine 100 is at rest (i.e. no wind). When generator assembly 104 is configured in configuration 7a, governor 130 is fully extended to achieve the maximum air gap 202 between rotors 120 and 122 and stators 128. When generator assembly 104 is configured in configuration 7a there is no impedance between rotors 120 and 122 and stators 128, such that rotors 120 and 122 may freely rotate without any magnetic cogging or lockup effect. As wind speed and RPM increases, the centrifugal force of governor 130 functions to compress governor 130, thereby pulling upper rotor 120 and lower rotor 122 inward to reduce air gap 202 (as shown in configuration 7b). As air gap 202 decreases, magnets 124 start to engage with coils 128 to generate power. As wind speed and RPM increases further, the centrifugal force of governor 130 functions to fully compress governor 130, thereby pulling upper rotor 120 and lower rotor 122 inward to reduce air gap 202 to a minimum distance (as shown in configuration 7c). When generator assembly 104 is engaged in configuration 7c, magnets 124 are fully engaged with coils 128 to generate maximum power. The power output of generator assembly 104 increases exponentially as air gap 202 is reduced between configuration 7a to configuration 7c.

Figure 9:
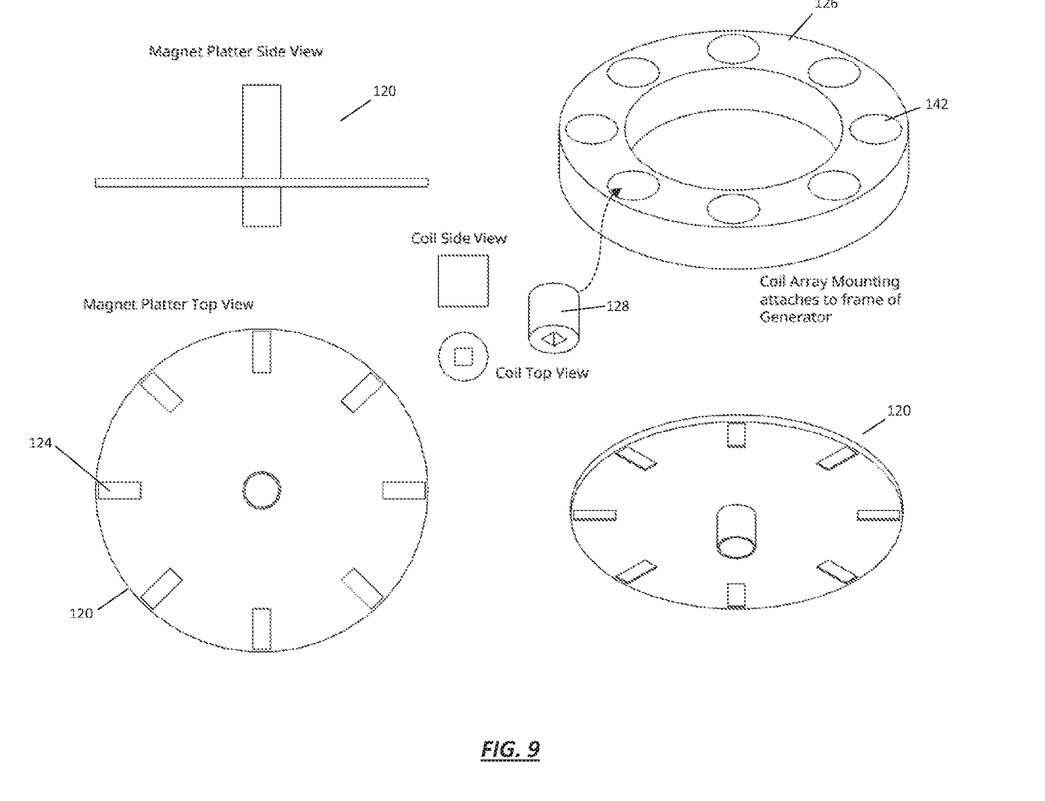
FIG. 9 is a series of isometric and plan views of generator components, according to an embodiment of the present disclosure.

Referring now to FIG. 9, various component views from generator assembly 104 is shown. According to an embodiment of the present disclosure, a top view of magnetic platter 120 shows a plurality of magnets 124 disposed equidistant around the circumference of magnetic platter 120 to define an array. Coil array housing 126 attaches to a frame of generator assembly 104. Coil array housing 126 comprises a plurality of apertures 142 disposed equidistant around the circumference of coil array housing 126 and configured to receive a plurality of coils 128 defining an array. According to various embodiments of the present disclosure, coils 128 comprise an iron laminate core to maximize power generation, as compared to hollow core coils used in prior art wind turbine solutions.

Referring again to FIG. 2 in specific reference to generator assembly 104, while the present disclosure has described generator assembly 104 in the context of various embodiments of vertical axis wind turbine 100, it is understood that generator assembly 104 may be operably engaged with any turbine system for power generation independently of turbine assembly 102. While generator assembly 104 provides specific benefits to vertical axis wind turbine 100 by dynamically altering the resistance (i.e. cogging effect) of magnets 124 to enable turbine assembly 102 to operate in low-wind conditions, the benefits of generator assembly 104 can be readily applied to any power-generating technology in which a turbine drives a generator for electricity generation. Such technologies may include vertical and horizontal axis wind turbines, as well as steam driven turbines, natural gas driven turbines, hydro driven turbines, and the like. Embodiments of generator assembly 104 are particularly beneficial in power-generating technologies in which the turbine input is dynamic, i.e. wind and some hydro technologies. However, generator assembly 104 may also provide benefits to natural gas driven and steam driven power production technologies by enabling such technologies to selectively alter the turbine input requirements by selectively configuring the spacing of upper magnet platter 120 and lower magnet platter 122 to decrease the starting resistance of generator assembly 104.

In further reference to FIG. 2, alternative embodiments of vertical axis wind turbine 100 provide for two or more generator assemblies 104 to be coupled to shaft 112. In accordance with such embodiments, two or more generator assemblies 104 are coupled or "ganged" above/below each preceding/successive generator assembly 104 on shaft 112. Each additional generator assembly 104 effectively increases the maximum power production capacity of vertical axis wind turbine 100 by the respective capacity of each generator assembly 104. Vertical axis wind turbine 100 may include as many generator assemblies 104 as are capable of being driven by the input capacity of turbine assembly 102 in relation to the desired output. For example, the larger the surface area of scoop portion 108, the greater the theoretical input capacity of turbine assembly 102. The number of generator assemblies 104 coupled to shaft 112 may be scaled up and down proportionally to the theoretical input capacity of turbine assembly 102. The number of generator assemblies 104, however, may be constrained by the length of shaft 112 in various embodiments.

Figure 10:
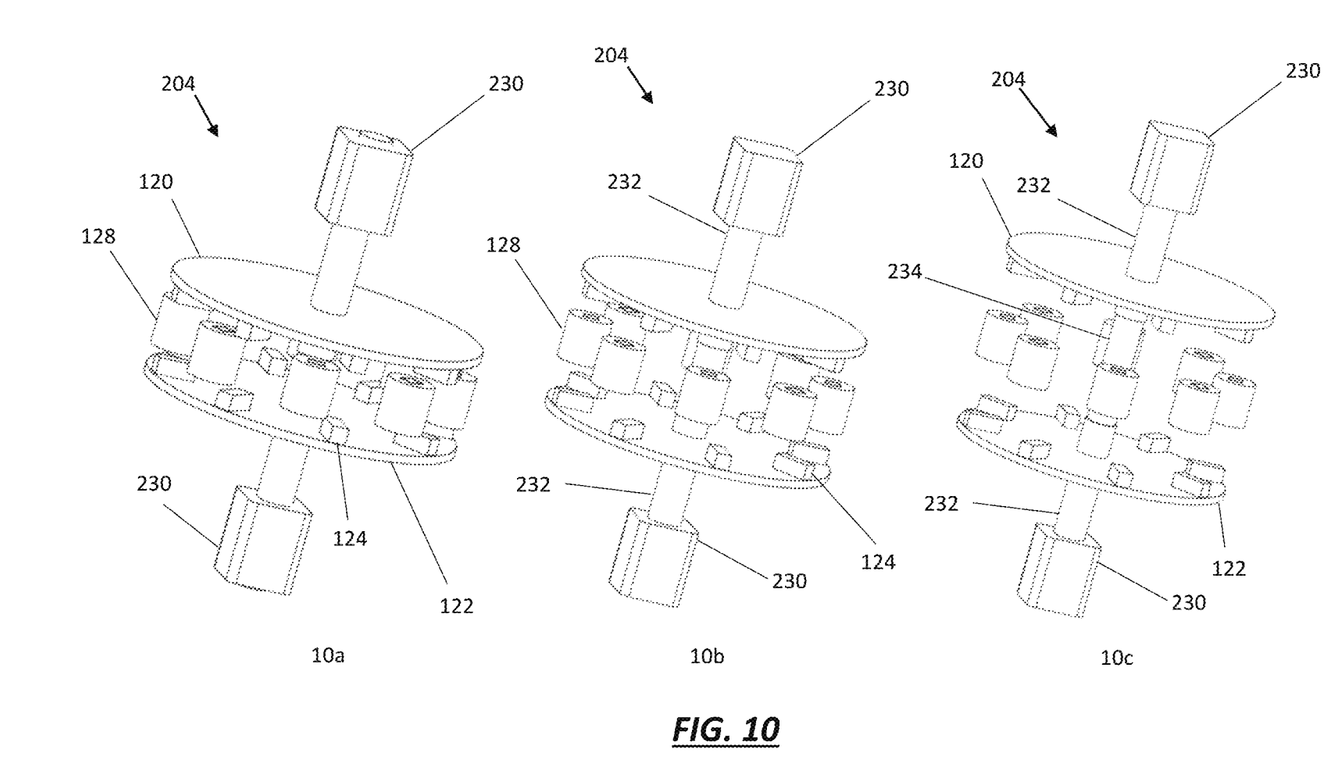
FIG. 10 is a series of functional views illustrating a configuration of a generator with a governor having a motor at various wind speeds in accordance with another aspect of the disclosure.

With reference to FIG. 10, in accordance with aspects of this disclosure, another generator 204 is illustrated in three different configurations 10a, 10b and 10c, which mirror configurations 7a, 7b, and 7c of generator 104 (see FIGS. 7 and 8). Indeed, to the extent consistent, all or some of the features of generator 104 may be applied to generator 204 and vice-versa, and therefore will not be further discussed with reference to FIG. 10.

Generator 204 includes one or more governors 230. Governor 230 is a motor, such as a servomotor, stepper motor, other rotary and linear actuators, and the like. In a servomotor or stepper motor aspect, the governor 230 is coupled to the rotors 120, 122 via rotor shafts 232. Rotor shafts 232 are collinear with and surround a main shaft 234, such that rotor shafts 234 may be moved up or down relative to the main shaft 234. Main shaft 234 may be a lower portion of shaft 112 shown in FIG. 1 or may be coupled to and collinear with shaft 112. The motor of the governor 230 is configured to electromechanically change the configuration of the generator 200 by moving the rotors 120 and 122 relative to the stators 128 (not shown in FIG. 10) by moving the rotor shafts 232 up or down the main shaft 234, as described similarly with respect to governor 130 and illustrated in FIGS. 6-8. In aspects, rotors 120, 122 may each be coupled to different governors 230 such that the rotors 120 and 122 may be moved independently of one another. In aspects, the governors 230 may be synced so as to coordinate change in position of the rotors 120 and 122 approximately simultaneously, similar to operation of ball governor 130.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A wind turbine apparatus comprising:
   a rotary shaft defining a central axis;
   a turbine blade assembly having one or more pairs of blades configured to be mateably interfaced to define a cylindrical shape when fully furled, each blade in the one or more pairs of blades being configured as equal oppositely oriented semicircles having a center point on a diameter of the circle when mateably interfaced, the one or more pairs of blades having an upper surface, a lower surface, and a side wall extending from the upper surface to the lower surface to define a scoop portion, the one or more pairs of blades being configured to furl and unfurl around the central axis; and,
   a generator assembly comprising an upper magnet platter and a lower magnet platter being disposed on the rotary shaft, a plurality of coils disposed around a circumference of the rotary shaft, and a governor assembly coupled to the rotary shaft, the governor assembly configured to adjust an upper axial air gap between the upper magnet platter and the plurality of coils and adjust a lower axial air gap between the lower magnet platter and the plurality of coils.
   wherein when the upper axial air gap and lower axial air gap are at a maximum distance, there is no impedance between the upper and lower magnetic platters and the plurality of coils such that there is no magnetic cogging.

2. The vertical axis wind turbine apparatus of claim 1 wherein the turbine blade assembly comprises three or more pairs of blades.

3. The vertical axis wind turbine apparatus of claim 2 wherein when the turbine blades are in an extended position, the turbine blades are oriented in a helical configuration.

4. The vertical axis wind turbine apparatus of claim 2, wherein the three or more pairs of blades form a helix configuration when in an extended position.

5. The vertical axis wind turbine apparatus of claim 1 wherein each pair of blades in the one or more pairs of blades are configured to be dynamically furled and unfurled proportionately to a wind speed.

6. The vertical axis wind turbine apparatus of claim 1 wherein each pair of blades in the one or more pairs of blades are configured to be dynamically furled and unfurled proportionately to a rotary speed of the turbine blade assembly.

7. The vertical axis wind turbine apparatus of claim 1, wherein the governor assembly is a motor, the motor configured to change linear position of the upper magnet platter or lower magnet platter.

8. The wind turbine apparatus of claim 1, wherein the governor assembly includes a first motor and a second motor, the first motor configured to change the position of either the upper magnet platter or lower magnet platter relative to the plurality of coils, and the second motor configured to change position of the other of the upper magnet platter or lower magnet platter relative to the plurality of coils.

9. The vertical axis wind turbine apparatus of claim 7, wherein the motor is a stepper motor or a servomotor.

10. The vertical axis wind turbine apparatus of claim 1, wherein the one or more pair of blades include a plurality of blade teeth disposed on a semicircular perimeter portion of the upper surface and lower surface of the blades, the blade teeth configured to interface each blade of the pair of blades, the blade teeth enable the blades to furl and unfurl blades between open and closed configurations.

11. A vertical axis wind turbine apparatus comprising:
    a turbine blade assembly having one or more pairs of blades configured to furl and unfurl around a central axis in proportion to a wind speed, each blade in the one or more pairs of blades defining a scoop;
    a rotary shaft being operably engaged with the turbine blade assembly; and,
    a generator assembly comprising an upper magnet platter and a lower magnet platter being disposed on the rotary shaft, a plurality of coils disposed around a circumference of the rotary shaft, and a governor assembly coupled to the rotary shaft, the governor assembly being operable to dynamically configure linear positions of the upper magnet platter and the lower magnet platter relative to the plurality of coils and in proportion to a rotary speed of the governor assembly.

12. The vertical axis wind turbine apparatus of claim 11 wherein the generator assembly is configured to define a variable axial air gap between the upper magnet platter and the lower magnet platter and the plurality of coils such that magnetic cogging is increased or decreased in proportion to a rotary speed of the governor assembly.

13. The vertical axis wind turbine apparatus of claim 12 wherein the governor assembly is configured to reduce the variable axial air gap between the upper magnet platter and the lower magnet platter and the plurality of coils in response to the governor assembly reaching a threshold rotary speed.

14. The vertical axis wind turbine apparatus of claim 11 wherein the governor assembly is configured as a ball governor, a servomotor, a stepper motor, or an electronic governor.

15. The vertical axis wind turbine apparatus of claim 11 further comprising two or more generator assemblies being disposed on the rotary shaft in proportion to an input capacity of the turbine assembly.

16. A vertical axis wind turbine apparatus comprising:
a turbine blade assembly having one or more pairs of blades, each blade having an upper surface, a lower surface, a side wall extending from the upper surface to lower surface to define a scoop portion, and blade teeth disposed on a semicircular perimeter portion of the upper surface and lower surface;
a generator assembly;
a rotary shaft having a shaft gear disposed thereon, the rotary shaft being operably engaged between the turbine assembly and the generator assembly, the shaft gear being configured to mateably interface with the blade teeth of each pair of blades in the one or more pairs of blades;
a blade support configured to couple each pair of blades in the one or more pairs of blades to the rotary shaft, the blade support operable to maintain a desired orientation between each pair of blades in the one or more pairs of blades; and,
the generator assembly comprising an upper magnet platter and a lower magnet platter being disposed on the rotary shaft, a plurality of coils disposed around a circumference of the rotary shaft, and a governor assembly coupled to the rotary shaft, the governor assembly being operable to dynamically configure spatial positions of the upper magnet platter and the lower magnet platter relative to the plurality of coils.

17. The vertical axis wind turbine apparatus of claim 16 further including a furling system configured to proportionately furl or unfurl the one or more pairs of blades according to a rotary speed of the turbine blade assembly.

18. The vertical axis wind turbine apparatus of claim 16 wherein each pair of blades in the one or more pairs of blades is configured to mateably interface when in a fully furled position.

19. The vertical axis wind turbine apparatus of claim 18 wherein the each pair of blades in the one or more pairs of blades forms a cylindrical shape when in the fully furled position or forms a helix configuration when in an extended position.

* * * * *